(12) United States Patent
Catalfamo et al.

(10) Patent No.: US 6,369,121 B1
(45) Date of Patent: Apr. 9, 2002

(54) APPARATUS AND PROCESS FOR IN-LINE PREPARATION OF HIPES

(75) Inventors: Vincenzo Catalfamo, Cincinnati; Thomas Michael Shiveley, Moscow; Gina Lynn Blum, Cincinnati; Paul Martin Lipic, West Chester; Thomas Allen DesMarais, Cincinnati, all of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/684,037

(22) Filed: Oct. 6, 2000

Related U.S. Application Data

(60) Provisional application No. 60/158,620, filed on Oct. 8, 1999.

(51) Int. Cl.[7] .................................................. C08J 9/28
(52) U.S. Cl. ......................................... 521/64; 521/63
(58) Field of Search ...................................... 521/64, 62

(56) References Cited

U.S. PATENT DOCUMENTS

| | | | |
|---|---|---|---|
| 3,988,508 A | 10/1976 | Lissant | 526/344 |
| 4,844,620 A | 7/1989 | Lissant et al. | 366/136 |
| 5,149,720 A | 9/1992 | DesMarais et al. | 521/63 |
| 5,189,070 A | 2/1993 | Brownscombe et al. | 521/64 |
| 5,250,576 A | 10/1993 | DesMarais et al. | 521/63 |
| 5,260,345 A | 11/1993 | DesMarais et al. | 521/148 |
| 5,827,909 A | 10/1998 | DesMarais | 523/346 |
| 5,900,437 A | 5/1999 | Mitchell et al. | 521/64 |

*Primary Examiner*—Morton Foelak
(74) *Attorney, Agent, or Firm*—Angela Marie Stone; Edward J. Milbrada

(57) ABSTRACT

A method of making high internal phase emulsions is described. The method forms high internal phase emulsion (HIPE) using a single pass through the static mixer. In alternative embodiments, the HIPE may be further processed to farther modify the size of dispersed phase droplets, to incorporate additional materials into the HIPE, to alter emulsion temperature, and the like.

11 Claims, 1 Drawing Sheet

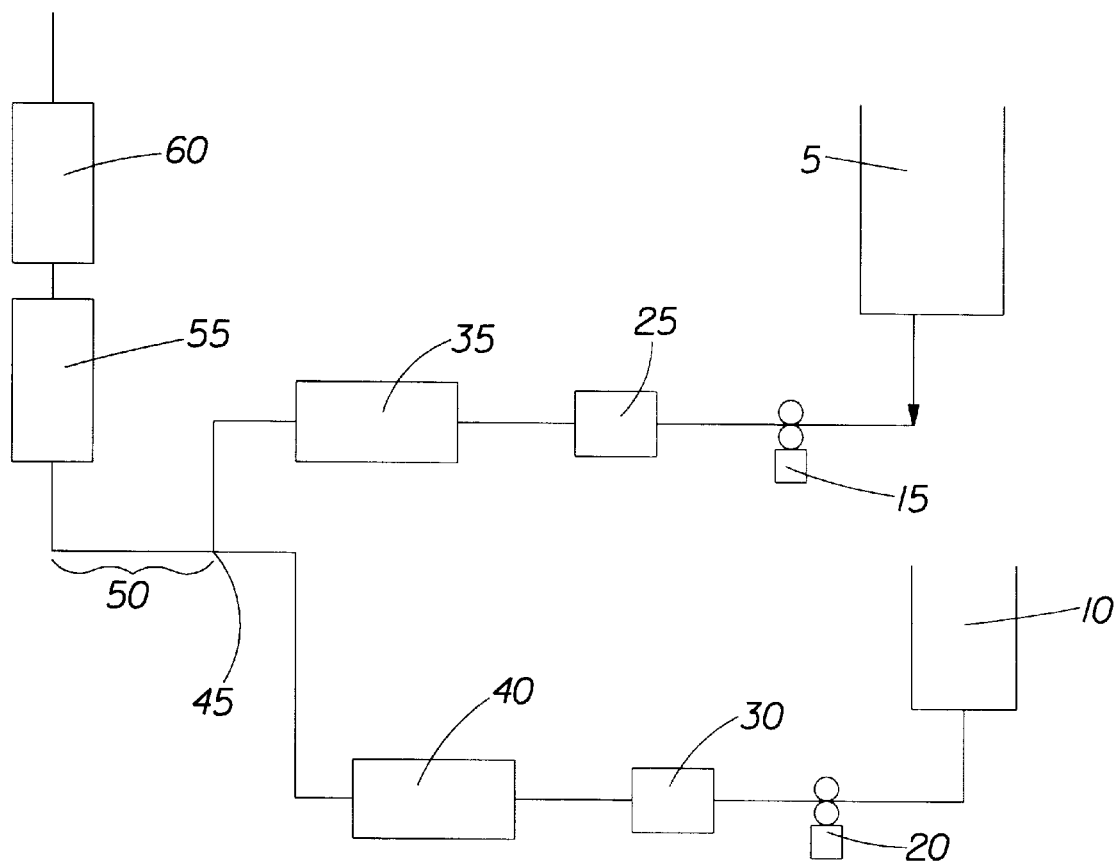

APPARATUS AND PROCESS FOR IN-LINE PREPARATION OF HIPES

This application claims the benefit of U.S. Provisional Application Ser. No. 60/158,620, filed Oct. 8, 1999.

FIELD OF INVENTION

This application relates to a process for making high internal phase emulsions (HIPE or HIPEs). This application particularly relates to a continuous process employing a static mixer to produce such emulsions.

BACKGROUND OF INVENTION

An emulsion is a dispersion of one liquid phase in another, substantially immiscible, continuous liquid phase. Water-in-oil (or oil in water) emulsions having a high ratio of dispersed phase to continuous phase are known in the art as High Internal Phase Emulsions hereafter referred to as "HIPE" or HIPEs). At relatively high dispersed phase to continuous phase ratios the continuous (external) phase becomes essentially a thin film separating and coating the droplet-like structures of the internal, dispersed phase. In one embodiment of particular commercial interest, the continuous oil phase of a water-in-oil HIPE comprises one or more polymerizable monomers. The oil phase can be then be polymerized forming a cellular structure (i.e. a foam) having a cell size distribution defined by the size distribution of the dispersed, internal-phase droplets. Since the cell size distribution has a substantial effect on the properties of the foam, it is advantageous to be able to closely control the droplet size of the internal, dispersed phase in a HIPE being produced for that purpose.

Water-in-oil HIPEs comprising a polymerizable oil phase are known to the art. See, for example, U.S. Pat. No. 3,988,508 (Lissant), issued Oct. 26, 1976; U.S. Pat. No. 5,149,720 (DesMarais et al.), issued Sep. 22, 1992; U.S. Pat. No. 5,260,345 (DesMarais et al.), issued Nov. 9, 1993; U.S. Pat. No. 5,189,070 (Brownscombe et al.), issued Feb. 23, 1993; U.S. Pat. No. 5,827,909 (DesMarais), issued Oct. 27, 1998; and U.S. Pat. No. 5,900,437 (Mitchell, et al.) issued May 4, 1999.

For production of HIPEs, the art has typically used mixers that use rotating elements to provide the shear necessary to disperse the internal phase throughout the continuous phase. See, for example, U.S. Pat. No. 5,250,576, issued to DesMarais, et al. on Oct. 5, 1993 and the aforementioned U.S. Pat. No. 5,827,909. While such mixers can provide HIPEs that are polymerizable into foams having desirable cell size distributions, improvements in the method of producing such HIPEs are needed. For example, it is well known that it is difficult to predictably scale mixers having rotating elements from a laboratory or pilot-plant scale to a full production scale. That is, simply increasing the size of a mixer to increase production capability (even if some process parameters, such as mixing element tip speed are matched) does not necessarily result in a HIPE having the same properties as are produced using a process designed around a smaller scale mixing apparatus. Thus there is a need for processes for producing HIPEs that can be more reliably scaled up to produce production quantities of HIPEs.

One means of applying shear that is more predictably scaleable than the rotating elements as are known to the art is the use of in-line mixers or static mixers. In such mixers fluid flow past fixed elements is divided and recombined by the arrangement of the elements to provide mixing.

The use of static mixers to form HIPEs is known to the art. For example, U.S. Pat. No. 4,844,620, issued to Lissant, et al on Jul. 4, 1989, describes a system that forms HIPEs by introducing an internal and an external phase into a recirculation loop that includes a static mixer. A small portion of the flow through the recirculation loop is withdrawn as product. While such a system may be successful in production of HIPEs, the system would be expected to produce HIPEs with an undesirably broad internal phase size distribution because at least a portion of the material in the product stream would have seen only a single pass through the static mixer. Since such single pass material would have experienced less shear the material would, of necessity, be dispersed into larger size particles. Further, if the HIPE is a water-in-oil HIPE where the oil phase is polymerizable, such polymerization would either star taking place in the recirculation loop (initiator present) or require injection of an initiator into the product stream. In either case the added process complexities are obvious.

Thus there is a further need for single pass processes that can produce HIPEs having relatively narrow size distributions. There is a still further need for Such single pass processes to be able to produce HIPEs that can be polymerized to produce HIPE-derived foams having a controlled, predictable, and narrow cell size distribution. There is also a need for single pass systems that are compatible with processes that operate at relatively high temperatures so as to accelerate such polymerization reactions.

SUMMARY OF THE INVENTION

A method of mixing two or more immiscible fluids to form high internal phase emulsions (HIPEs) comprising the steps of:

a) providing a first phase;

b) providing a second phase, wherein said second phase is substantially immiscible with said first phase and the ratio of said first phase to said second phase is between about 2:1 and about 250:1, c) combining said first and second phases to provide a premixed process stream;

d) processing said premixed process stream using at least one static mixer segment in a single pass so as to provide sufficient shear to emulsify said first phase in said second phase creating said high internal phase emulsion having a internal phase size distribution with a mean particle size.

Preferred phase compositions, static mixer setup and the like are also described. The method of the present invention is particularly useful for preparing HIPEs that are subsequently polymerized to provide HIPE-derived foams.

BRIEF DESCRIPTION OF THE DRAWINGS

FIG. 1 is a schematic drawing of a process for producing high internal phase emulsions using a static mixer.

DETAILED DESCRIPTION OF THE INVENTION

I. OIL PHASE AND WATER PHASE COMPONENTS OF HIPE

A. In General

The system and process of the present invention is particularly useful in preparing emulsions having a relatively high ratio of an internal phase to a continuous external phase as are commonly known to the art as HIPEs. It a preferred embodiment, water-in-oil HIPEs may be prepared. These HIPEs can be formulated to have a relatively wide range of internal to carnal (e.g. dispersed to continuous) phase ratios.

With respect to water-in-oil HIPEs, the particular water-to-oil phase ratio selected will depend on a number of factors, including the particular oil and water phase components present, the particular use to be made of the HIPE, and the particular properties desired for the HIPE. Generally, the ratio of water-to-oil phase in the HIPE is at least about 2:1, and is typically in the range of from about 2:1 to about 250:1, more typically from about 4:1 to about 250:1, even more typically from about 12:1 to about 200:1, and most typically from about 12:1 to about 150:1.

For the HIPEs according to the present invention that are subsequently polymerized to provide polymeric foams hereafter referred to as "HIPE-derived foams"), the relative amounts of the water and oil phases used to form the HIPE are, among many other parameters, important in determining the structural, mechanical and performance properties of the resulting HIPE foams. In particular, the ratio of water to oil phase in the HIPE can influence the density, cell size, and capillarity of the foam, as well as the dimensions of the struts that form the foam. HIPEs according to the present invention used to prepare these foams will generally have water-to-oil phase ratios in the range of from about 12:1 to about 250:1, preferably from about 12:1 to about 200:1, most preferably from about 12:1 to about 150:1.

B. The Oil Phase

1. The Oil

The oil phase of the HIPE can comprise a variety of oily materials. The particular oily materials selected will frequently depend upon the particular use to be made of the HIPE. By "oily" is meant a material, solid or liquid, but preferably liquid at room temperature that broadly meets the following requirements: (1) is sparingly soluble (or insoluble) in water; (2) has a low surface tension; and (3) possesses a characteristic greasy feel to the touch. Additionally, for those situations where the HIPE is to be used in the food, drug, or cosmetic area, the oily material should be cosmetically and pharmaceutically acceptable. Materials contemplated as oily materials for use in making HIPEs according to the present invention can include, for example, various oily compositions comprising straight, branched and/or cyclic paraffins such as mineral oils, petroleums, isoparaffins, squalanes; vegetable oils, animal oils and marine oils such as tung oil, oiticica oil, castor oil, linseed oil, poppyseed oil, soybean oil, cottonseed oil, corn oil, fish oils, walnut oils, pineseed oils, olive oil, coconut oil, palm oil, canola oil, rapeseed oil, sunflower seed oil, safflower oil sesame seed oil, peanut oil and the like; esters of fitty acids or alcohols such as ethyl hexylpalmitate, $C_{16}$ to $C_{18}$ fatty alcohol di-isootanoates, dibutyl phthalate, diethyl maleate, tricresyl phosphate, acrylate or methacrylate esters, and the like; resin oils and wood distillates including the distillates of turpentine, rosin spirits, pine oil, and acetone oil; various petroleum based products such as gasolines, naphthas, gas fuel, lubricating and heavier oils; coal distillates including benzene, toluene, xylene, solvent naphtha creosote oil and anthracene oil and ethereal oils: and silicone oils. Preferably, the oily material is non-polar. Also contemplated as a suitable oil phase is a monomer composition, comprising one or more monomers, that, after formation into a HIPE using the method of the present invention, can be polymerized into a polymeric foam.

In one optional embodiment of the present invention the oil phase comprises:
(a) from about 80% to about 98% by weight of a monomer component capable of forming a copolymer having a Tg value of from about −20° C. to about 90° C., said monomer component comprising:
(i) from about 10% to about 70% by weight of a substantially water-insoluble, monofunctional monomer capable of forming a homopolymer having a Tg of about 35° C. or less;
(ii) from about 10% to about 70% by weight of a substantially water-insoluble, monofunctional comonomer capable of imparting toughness about equivalent to that provided by styrene;
(iii) from about 2% to about 50% of a first substantially water-insoluble, polyfunctional crosslinking agent selected from the group consisting of divinyl benzene and analogs thereof; and
(iv) from about 0% to about 15% of a second substantially water-insoluble, polyfunctional crosslinking agent selected from the group consisting of diacrylates of diols and analogs thereof; and
(b) from about 2% to about 20% by weight of an emulsifier component which is soluble in the oil phase and which is suitable for forming a stable water-in-oil emulsion;

For preferred HIPEs that are polymerized to form the polymeric foams, this oil phase comprises a monomer component. This monomer component is in one embodiment formulated to form a copolymer having a glass transition temperature (Tg) of about 35° C. or lower, and typically from about −10° C. to about 300° C. (The method for determining Tg by Dynamic Mechanical Analysis (DMA) is described in the TEST METHODS section of U.S. Pat. No. 5,650,222, issued to Thomas A. DesMarais, et al. on Jul. 22, 1997, which is incorporated by reference. This monomer component includes: (a) at least one monofunctional monomer whose atactic amorphous polymer has a Tg of about 250° C. or lower, (b) optionally a monofunctional comonomer; and (c) at least one polyfunctional crosslinking agent. Selection of particular types and amounts of monofunctional monomer(s) and comonomer(s) and polyfunctional crosslinking agent(s) can be important to the realization of HIPE foams having the desired combination of structure, mechanical, and fluid handling properties that render such materials suitable for use as absorbents (e.g. for aqueous fluids, as insulating materials, an in other uses where such properties provide benefit to the final structure.

For such HIPE foams, the monomer component comprises one or more monomers that tend to impart rubber-like properties to the resulting polymeric foam structure. Such monomers can produce high molecular weight (greater than 10,000) atactic amorphous polymers having Tgs of about 25° C. or lower. Monomers of this type include, for example, monoenes such as the ($C_4$–$C_{14}$) a allyl acrylates such as butyl acrylate, hexyl acrylate, octyl acrylate, 2-ethylhexyl acrylate, nonyl acrylate, decyl acrylate, dodecyl (lauryl) acrylate, isodecyl acrylate tetradecyl acrylate, aryl acrylates and alkaryl acrylates such as benzyl acrylate, nonylphenyl acrylate, the ($C_6$–$C_{16}$) alkyl methacrylates such as hexyl acrylate, octyl methacrylate, nonyl methacrylate, decyl methacrylate, isodecyl methacrylate, dodecyl (lauryl) methacrylate, tetradecyl methacrylate, ($C_4$–$C_{12}$) alkyl styrenes such as p-n-octylstyrene, acrylamides such as N-octadecyl acrylamide, and polyenes such as 2-methyl-1, 3-butadiene (isoprene), butadiene, 1,3-pentadiene (piperylene), 1,3-hexadiene, 1,3-heptadiene, 1,3-octadiene, 1,3-nonadiene, 1,3-decadiene, 1,3-undecadiene, 1,3-dodecadiene, 2-methyl-1,3-hexadiene, 6-methyl-1,3- heptadiene, 7-methyl-1,3-octadiene, 1,3,7-octatriene, 1,3,9-decatriene, 1,3,6-octatriene, 2,3-dimethyl-1,3-butadiene, 2-methyl-3-ethyl-1,3-butadiene, 2-methyl-3-propyl-1,3-butadiene, 2-amyl-1,3-butadiene, 2-methyl-1,3-pentadiene, 2,3-dimethyl-1,3-pentadiene, 2-methyl-3-ethyl-1,3-pentadiene, 2-methyl-3-propyl-1,3-pentadiene, 2,6-diethyl-1,3,7-octatriene, 2,7-dimethyl-1,3,7-octatriene, 2,6-dimethyl-1,3,6-octatriene, 2,7-dimethyl-1,3,6-octatriene, 7-methyl-3-methylene-1,6-octadiene (myrcene), 2,6-dimethyl-1,5,7-octatriene (ocimene), 1-methyl-2-vinyl4,6-hepta-dieny-3,8-nonadienoate, 5-methyl-1,3,6-heptatriene, 2-ethylbutadiene, and mixtures of these monomers. Of these monomers, isodecyl acrylate, n-dodecyl acrylate and 2-ethylhexyl acrylate are the most preferred. The monomer will generally comprise 30 to about 85%, more preferably from about 50 to about 70%, by weight of the monomer component.

For such HIPE foams, the monomer component also typically comprises one or more comonomers that are typically included to modify the Tg properties of the resulting polymeric foam structure, its modulus (strength), and its toughness. These monofunctional comonomer types can include styrene-based comonomers (e.g., styrene and ethyl styrene) or other monomer types such as methyl methacrylate where the related homopolymer is well known as exemplifying toughness. Of these comonomers, styrene, ethyl styrene, and mixtures thereof are particularly preferred for imparting toughness to the resulting polymeric foam structure. These comonomers can comprise up to about 40% of the monomer component and will normally comprise from about 5 to about 40%, preferably from about 10 to about 35%, most preferably from about 15 about 30%, by weight of the monomer component. In one embodiment of the present invention these comonomers are capable of imparting toughness about equivalent to that provided by styrene.

For such HIPE foams, this monomer component also includes one or more polyfunctional crosslinking agents. The inclusion of these crosslinking agents tends to increase the Tg of the resultant polymeric foam as well as its strength with a resultant loss of flexibility and resilience. Suitable crosslinking agents include any of those that can be employed in crosslinking rubbery diene monomers, such as divinylbenzenes, divinyltoluenes, divinylxylenes, divinylnaphthalenes divinylalkylbenzenes, divinylphenanthrenes, trivinylbenzenes, divinylbiphenyls, divinyldiphenylmethanes, divinylbenzyls, divinylphenylethers, divinyldiphenylsulfides, divinylfurans, divinylsulfone, divinylsulfide, divinyldimethylsilane, 1,1'-divinylferrocene, 2-vinylbutadiene, maleate, di-, tri-, tetra-, penta- or higher (meth)acrylates and di-, tri-, tetra-, penta- or higher (meth)acrylamides, including ethylene glycol dimethacrylate, neopentyl glycol dimethacrylate, 1,3-butanediol dimethacrylate, 1,4-butanediol dimethacrylate, 1,6-hexanediol dimethacrylate, 2-butenediol dimethacrylate, diethylene glycol dimethacrylate, hydroquinone dimethacrylate, catechol dimethacrylate, resorcinol dimethacrylate, triethylene glycol dimethacrylate, polyethylene glycol dimethacrylate; trimethylolpropane trimethacrylate, pentaerythntol tetramethacrylate, 1,3-butanediol diacrylate, 1,4-butanediol diacrylate, 1,6-hexanediol diacrylate, diethylene glycol diacrylate, hydroquinone diacrylate, catecliol diacrylate, resorcinol diacrylate, triethylene glycol diacrylate, polyethylene glycol diacrylate; pentaerythritol tetraacrylate, 2-butenediol diacrylate, tetramethylene diacrylate, trimethyol propane triacrylate, pentaerydritol tetraacrylate, N-methylolacrylamnide, 1,2-ethylene bisacrylamide, 1,4-butane bisacrylamide, and mixtures thereof.

The preferred polyfunctional crosslinking agents include divinylbenzene, ethylene glycol dimethacrylate, diethylene glycol dimethacrylate, 1,6-hexanediol dimethacrylate, 2-butenediol dimethacrylate, ethylene glycol diacrylate, diethylene glycol diacrylate, 1,6-hexanediol diacrylate, 2-butenediol diacrylate, trimethylolpropane triacrylate and trimethacrylate, and mixtures thereof. Divinyl benzene is typically available as a mixture with ethyl styrene in proportions of about 55:45. These proportions can be modified so as to enrich the oil phase with one or the other component. Generally, it is advantageous to enrich the mixture with the ethyl styrene component while simultaneously omitting inclusion of styrene from the monomer blend. The preferred ratio of divinyl benzene to ethyl styrene is from about 30:70 to 55:45, most preferably from about 35:65 to about 45:55. The inclusion of higher levels of ethyl styrene imparts the required toughness without increasing the Tg of the resulting copolymer to the degree that styrene does. The cross-linking agent can generally be included in the oil phase of the HIPE in an amount of from about 3 to about 40%, more preferably from about 4 to about 40%, most preferably from about 5 to about 40%, by weight of the monomer component (100% basis).

The major portion of the oil phase of these preferred HIPEs will comprise these monomers, comonomers and crosslinking agents. It is essential that these monomers, comonomers and crosslinking agents be substantially water-insoluble so that they are primarily soluble in the oil phase and not the water phase. Use of such substantially water-insoluble monomers ensures that HIPE of appropriate characteristics and stability will be realized.

It is, of course, highly preferred that the monomers, comonomers and crosslinking agents used herein be of the type such that the resulting polymeric foam is suitably non-toxic and appropriately chemically stable. These monomers, comonomers and cross-linking agents should preferably have little or no toxicity if present at very low residual concentrations during post-polymerization foam processing and/or use.

2. Emulsifier Component

Another typical component of the oil phase is an emulsifier (or emulsifiers) that permits the formation of stable HIPE emulsions. Suitable emulsifiers for use herein can include any of a number of conventional emulsifiers applicable for use in low and mid-internal-phase emulsions. The particular emulsifiers used will depend upon an number of factors, including the particular oily materials present in the oil phase and the particular use to be made of the HIPE. Usually, these emulsifiers are noniomic materials and can have a wide range of HLB values. Examples of some typical emulsifiers include sorbitan esters such as sorbitan laurates (e.g., SPAN® 20), sorbitan palmitates (e.g., SPAN® 40), sorbitan stearates (e.g., SPAN® 60 and SPAN® 65), sorbitan monooleates (e.g., SPAN® 80), sorbitan trioleates (e.g., SPAN® 85), sorbitan sesquioleates (e.g., EMSORB® 2502), and sorbitan isostearates (e.g., CRILL® 6); polyglycerol esters and ethers (e.g., TRIODAN® 20); polyoxyethylene (2) fatty acids, esters and ethers such as polyoxyethylene (2) oleyl ethers, polyethoxylated oleyl alcohols (e.g. BRIJ® 92 and SIMUSOL® 92), etc., mono-, di-, and triphosphoric esters such as mono-, di-, and triphosphoric esters of oleic acid (e.g., HOSTAPHAT KO3OON), polyoxyethylene sorbitol esters such as polyoxyethylene sorbitol hexastearates (e.g., ATLAS® G-1050), ethylene glycol fatty acid esters, glycerol mono-isostearates (e.g., IMWITOR 78OK), ethers of glycerol and fatty alcohols (e.g., CREMOPHOR WO/A), esters of polyalcohols, synthetic primary alcohol ethylene oxide condensates (e.g., SYNPERONIC A2), mono and diglycerides of fatty acids (e.g., ATMOS® 300), and the like.

Other preferred emulsifiers include the diglycerol esters derived from monooleate, monomyristate, monopalmitate, and monoisostearate acids. A preferred coemulsifier is ditailowdimethyl ammonium methyl sulfate. Mixtures of these emulsifiers are also particularly useful, as are purified versions of each, specifically sorbitan esters containing minimal levels of isosorbide and polyol impurities.

For preferred HIPEs that are polymerized to make polymeric foams, the emulsifier can serve other functions besides stabilizing the HIPE. These include the ability to hydrophilize the resulting polymeric foam. The resulting polymeric foam is typically washed and dewatered to remove most of the water and other residual components. This residual emulsifier can, if sufficiently hydrophilic, render the otherwise hydrophobic foam sufficiently wettable so as to be able to absorb aqueous fluids.

For preferred HIPEs that are polymerized to make polymeric foams, suitable emulsifiers can include sorbitan monoesters of branched $C_{16}$–$C_{24}$ fatty acids, linear unsaturated $C_{16}$–$C_{22}$ fatty acids, and linear saturated $C_{12}$–$C_{14}$ fatty acids, such as sorbitan monooleate, sorbitan monomyristate, and sorbitan monoesters derived from coconut fatty acids; diglycerol monoesters of branched $C_{16}$–$C_{24}$ fatty acids, linear unsaturated $C_{16}$–$C_{22}$ fatty acids, or linear saturated $C_{12}$–$C_{14}$ fatty acids, such as diglycerol monooleate (i.e., diglycerol monoesters of Cl8:1 fatty acids), diglycerol monomyristate, diglycerol monoisostearate, and diglycerol monoesters of coconut fatty acids; diglycerol monoaliphatic ethers of branched $C_{16}$–$C_{24}$ alcohols (e.g. Guerbet alcohols), linear unsaturated $C_{16}$–$C_{22}$ alcohols, and linear saturated $C_{12}$–$C_{14}$ alcohols (e.g., coconut fatty alcohols), and mixtures of these emulsifiers. See U.S. Pat. No. 5,287,207 (Dyer et al.), issued Feb. 7, 1995 (herein incorporated by reference) which describes the composition and preparation suitable polyglycerol ester emulsifiers and U.S. Pat. No. 5,500,451, issued Mar. 19, 1996 to Stephen A. Goldman et al. (which is incorporated by reference herein), which describes the composition and preparation suitable polyglycerol ether emulsifiers. Preferred emulsifiers include sorbitan monolaurate (e.g., SPAN® 20, preferably greater than about 40%, more preferably greater than about 50%, most preferably greater than about 70% sorbitan monolaurate), sorbitan monooleate (e.g., SPAN® 80, preferably greater than about 40%/o, more preferably greater than about 50%, most preferably greater than about 70% sorbitan monooleate), diglycerol monooleate (e.g., preferably greater than about 40%, more preferably greater than about 50%, most preferably greater than about 70% diglycerol monooleate), diglycerol monoisostearate (e.g., preferably greater than about 40%, more preferably greater than about 50%, most preferably greater than about 70% diglycerol monoisostearate), diglycerol monomyristate (e.g., preferably greater than about 40%, more preferably greater than about 50%, most preferably greater than about 70% sorbitan monomyristate), the cocoyl (e.g., lauryl and myristoyl) ethers of diglycerol, and mixtures thereof.

A particularly preferred emulsifier is described in copending U.S. patent application Ser. No. 09/490,654, entitled Foam Materials and High Internal Phase Emulsions Made Using Oxidatively Stable Emulsifiers, filed in the name of Hird, et al. on Jan. 24, 2000. Such emulsifiers comprise a composition made by reacting a hydrocarbyl substituted succinic acid or anhydride or a reactive equivalent thereof with either a polyol (or blend of polyols), a polyamine (or blend of polyamines) an alkanolamine (or blend of alkanol amines), or a blend of two or more polyols, polyamines and alkanolamines. The lack of substantial carbon-carbon unsaturation rendering them substantially oxidatively stable.

In addition to these primary emulsifiers, co-emulsifiers can be optionally included in the oil phase. These co-emulsifiers are at least cosoluble with the primary emulsifier in the oil phase. Suitable co-emulsifiers can be zwitterionic types, including the phosphatidyl cholines and phosphatidyl choline-containing compositions such as the lecithins and aliphatic betaines such as lauryl betaine; cationic types, including long chain $C_{12}$–$C_{22}$ dialiphatic, short chain $C_1$–$C_4$ dialiphatic quaternary ammonium salts such as ditallow dimethyl ammonium chloride, bistridecyl dirnethyl ammonium chloride, and ditallow dimethyl ammonium methylsulfate, the long chain $C_{12}$–$C_{22}$ dialkoyl(alkenoyl)-2-hydroxyethyl, short chain $C_1$–$C_4$ dialiphatic quaternary ammonium salts such as ditallowoyl-2-hydroxyethyl dimethyl ammonium chloride, the long chain $C_{12}$–$C_{22}$ dialiphatic imidazolinium quaternary ammonium salts such as methyl-l-tallow amido ethyl-2-tallow imidazolinium methylsulfate and methyl-1-oleyl amido ethyl-2-oleyl imidazolinium methylsulfate, the short chain $C_1$–$C_4$ dialiphatic, long chain $C_{12}$–$C_{22}$ monoaliphatic benzyl quaternary ammonium salts such as dimethyl stearyl benzyl ammonium chloride and dimethyl tallow benzyl ammonium chloride, the long chain $C_{12}$–$C_{22}$ dialkoyl(alkenoyl)-2-aminoethyl, short chain $C_1$–$C_4$ monoaliphatic, short chain $C_1$–$C_4$ monohydroxyaliphatic quaternary ammonium salts such as ditallowoyl-2-aminoethyl methyl 2-hydroxypropyl ammonium methyl sulfate and dioleoyl-2-aminoethyl methyl 2-hydroxyethyl ammonium methyl sulfate; anionic types including the dialiphatic esters of sodium sulfosuccinic acid such as the dioctyl ester of sodium sulfosuccinic acid and the bistridecyl ester of sodium sulfosuccinic acid, the amine salts of dodecylbenzene sulfonic acid; and mixtures of these secondary emulsifiers. The preferred secondary emulsifiers are ditallow dimethyl ammonium methyl sulfate and ditallow dimethyl ammonium methyl chloride. When these optional secondary emulsifiers are included in the emulsifier component, it is typically at a weight ratio of primary to secondary emulsifier of from about 50:1 to about 1:4, preferably from about 30:1 to about 2:1.

3. Oil Phase Composition

The oil phase used to form the HIPE according to the process of the present invention can comprise varying ratios of oily materials and emulsifier. The particular ratios selected will depend on a number of factors including the oily materials involved, the emulsifier used, and the use to be made of the HIPE. Generally, the oil phase can comprise from about 50 to about 98% by weight oily materials and from about 2 to about 50% by weight emulsifier. Typically, the oil phase will comprise from about 70 to about 97% by weight of the oily materials and from about 3 to about 30% by weight emulsifier, and more typically from about 85 to about 97% by weight of the oily materials and from about 3 to about 15% by weight emulsifier.

For preferred HIPEs used to make polymeric foams, the oil phase will generally comprise from about 65 to about 98% by weight monomer component and from about 2 to about 35% by weight emulsifier component. Preferably, the oil phase will comprise from about 80 to about 97% by weight monomer component and from about 3 to about 20% by weight emulsifier component. More preferably, the oil phase will comprise from about 90 to about 97% by weight monomer component and from about 3 to about 10% by weight emulsifier component.

In addition to the monomer and emulsifier components, the oil phase of these preferred HIPEs can contain other optional components. One such optional component is an oil soluble polymerization initiator of the general type well known to those skilled in the art, such as described in U.S. Pat. No. 5,290,820 (Bass et al.), issued Mar. 1, 1994, which is incorporated by reference. Another possible optional component is a substantially water insoluble solvent for the monomer and emulsifier components. Use of such a solvent is not preferred, but if employed will generally comprise no more than about 10% by weight of the oil phase.

A preferred optional component is an antioxidant such as a Hindered Amine Light Stabilizer (HALS), such as bis-1, 2,2,5,5-pentarnethylpiperidinyl) sebacate (Trinuvin 765) or a Hindered Phenolic Stabilizer (IPS) such as Irganox 1076 and t-butylhydroxyquinone. Another preferred optional component is a plasticizer such as dioctyl azelate, dioctyl sebacate or dioctyl adipate. Other optional components include fillers, colorants, fluorescent agents, opacifying agents, chain transfer agents, and the like.

C. Water Phase Components

The internal water phase of the HIPE is generally an aqueous solution containing one or more dissolved components. One dissolved component of the water phase is a water-soluble electrolyte. The dissolved electrolyte minimizes the tendency of the components in the oil phase to also dissolve in the water phase. For preferred HIPEs used to make polymeric foams, this is believed to minimize the extent to which polymeric material fills the cell windows at the oil/water interfaces formed by the water phase droplets during polymerization. Thus, the presence of electrolyte and the resulting ionic strength of the water phase is believed to determine whether and to what degree the resulting preferred HIPE foams can be open-celled.

Any electrolyte capable of imparting ionic strength to the water phase can be used. Preferred electrolytes are mono-, di-, or trivalent inorganic salts such as the water-soluble halides, e.g., chlorides, nitrates and sulfates of alkali metals and alkaline earth metals. Examples include sodium chloride, calcium chloride, sodium sulfate and magnesium sulfate. For HIPEs that are used to make polymeric foams, calcium chloride has been found to be suitable for use in the process according to the present invention. Generally the electrolyte will be utilized in the water phase of the HIPE in a concentration in the range of from about 0.2 to about 30% by weight of the water phase. More preferably, the electrolyte will comprise from about 1 to about 20% by weight of the water phase.

For HIPEs used to make polymeric foams, a polymerization initiator is typically included in he HIPE. Such an initiator component can be added to the water phase of the HIPE and can be any conventional water-soluble free radical initiator. These include peroxygen compounds such as sodium, potassium and ammonium persulfates, hydrogen peroxide, sodium peracetate, sodium percarbonate and the like. Conventional redox initiator systems can also be used. Such systems are formed by combining the foregoing peroxygen compounds with reducing agents such as sodium bisulfite, L-ascorbic acid or ferrous salts. The initiator can be present at up to about 20 mole percent based on the total moles of polymerizable monomers in the oil phase. Preferably, the initiator is present in an amount of from about 0.001 to 10 mole percent based on the total moles of polymerizable monomers in the oil phase.

D. Other Components Suitable for Use

It should be recognized that other components than those described could be used to produce HIPEs using the system and process of the present invention. For example, the two fluids could consist of a dispersed gas and a liquid which by virtue of the stability provided by very small, uniform cell sizes can be used to uniformly contact relatively large surfaces with a relatively small amount of an active carried in the continuous, external phase.

In another example, the dispersed liquid can contain an active ingredient that is soluble (or insoluble) which, upon the polymerization of the continuous (external) phase and evaporation of the dispersed (internal) phase, coats (or is contained in) the polymerized cells for form a polymer foam with various properties. Examples may include activated carbon microparticles for filters, microorganisms for bioreactive structures, enzymes, RF excitable photoactives for lighting structures, powdered metals for anodic and cathodic battery and fuel cell structures, ferromagnetic powders, adhesives for impression foams, dye and ink for dye and ink dispensing foams, plant nutrients for plant carriers and artificial turf, flavorings for edible foam foodstuffs, beverage flavorings (e.g. tea, coffee and the like) for beverage producing filters, aromatics and essential oils for odor delivery, infrared attenuating agents, gelatinizing powders such as starch for cushions, and concrete for light weight structural foams.

II. SYSTEM AND PROCESS EMPLOYING THE SYSTEM TO PRODUCE HIPEs

The method of the present invention for producing HIPEs generally consists of a means for pressuring the components in two or more streams, a means of injecting each stream into a common stream, and at least one static mixer which receives the common stream and outputs a finished HIPE.

It should be realized that the viscosity of the component phases (i.e. the individual streams) is typically much less than that of the emulsion. As the two or more streams are mixed, the HIPE forms and, as the droplet size of the dispersed phase decreases and becomes more uniform, the viscosity of the HIPE increases along with the shear force needed to further reduce droplet size. However, if too much shear force is applied, the continuous phase will be ruptured allowing the discontinuous phase droplets to re-combine. Further the distribution of the individual phases during the mixing process must be kept uniform, not only for purposes of having a uniform viscosity, but also to insure that the distribution of components being mixed is uniform.

As noted above, the art has typically used dynamic mixers employing rotating elements for the production of HIPEs. By their very nature rotating elements such a blades, pins, paddles, and the like do not have a uniform tangential speed. Consequently, when a fluid, flowing in the direction of an axis, encounters an element rotating in a plane at an angle to the axis, (typically the plane is the 90 degree cross section) more shear will be imparted at the radial extreme of the element than at the center of rotation. This difference in applied shear makes preparation of uniform HIPEs problematic because more shear than optimal may be imparted at the outer radius while less than optimal may be imparted near the center of rotation. Further, the differences in applied shear have differing impacts depending on the size of the rotating element making scale-up difficult.

In contrast, static elements, as used according to the present invention, that are placed in a viscous, laminar flow, will impart a relatively uniform shear along their length to the extent permitted by the velocity cross section. In a static mixer fluids in a conduit flow along stationary elements with a vector component in the same direction as the flow. Consequently, the relative velocities of the fluid and the mixing elements can be relatively constant across the cross section of the flow. Because such relative velocities are relatively constant, in-line mixers using static elements can be predictably sized according to production needs. As used herein, a "static mixer" or "in-line mixer" is an assembly of one or more segments that mixes or blends a material flowing through a flow conduit by subdividing and recombining the flow. A "segment" is an assembly of "elements" that is inserted in the flow conduit. An "element" is a portion of a segment that divides the material flowing through the flow conduit into at least two streams that are combined with separate streams provided by other elements of the segment downstream thereof so as to mix the streams.

An example of a suitable static mixer is the Sulzer Chemtech SMX mixer for viscous mixing, available from Sulzer Chemtech USA, Deer Park, Tex. A similar device is described in U.S. Pat. No. 5,620,252 (Maurer) issued Apr. 15, 1997 which is hereby incorporated herein by reference. In this type of mixer, flat mixing element bars are positioned in a flow conduit at a constant angle to the conduit axis. The elements are arranged in uniform segments of elements with segments of the elements rotated about the axis within a uniform conduit so as to divide the material flowing through the conduit in a multiplicity of directions Such a design, has been found to provide for a uniform flow rate, not only across the cross section, but also less along the axis of the mixer. As will be recognized, other static mixer designs that provide for such uniform flow rates across the cross section of the flow conduit are also suitable for purposes of the present invention.

For purposes of the present invention, a static mixer for preparing HIPEs should be tailored with respect to element size, element orientation, or conduit cross section, or all of these parameters to provide for varying velocities and shearing forces along the axis of the mixer while maintaining a relatively constant forces across the flow. To be suitable for purposes of the present invention, a static mixer must comprise at least one segment. In other embodiments of the present invention the static mixer comprises at least two segments that are rotated at an angle relative to each other. A preferred angle of rotation is 90°. It has also been found that a static mixer having a segment length approximately equal to the conduit diameter provides desirable mixing properties. As also will be recognized, the number of segments and their relation can be varied as desired to provide specific HIPE properties. Mixers having more than 20 segments, typically more than 30 segments are particularly useful. An exemplary mixer has between about 36 and 48 segments wherein each of the segments has a diameter equal to the conduit diameter and a rotational orientation of 90° with respect to the segments immediately upstream and downstream thereof.

It is desirable for some initial premixing of the substantially immiscible streams to have occurred prior to entry into the static mixer. This helps insure that portions of both streams are juxtaposed across the cross section of the flow conduit. Here, the component parts are in separate streams each having a relatively low viscosity (i.e. the intrinsic viscosity defined by the stream composition). Initially, the streams only experience shear forces very near mixing elements. By allowing a brief period of turbulent mixing between the point where the streams are combined and the entry into the first mixer segment provides an initial distribution of both streams across the cross section of the flow conduit so that the streams are more readily subdivided and mixed with each other.

FIG. 1 shows a preferred embodiment of the present invention. The water phase is mixed (as necessary) in water phase supply tank 5. Similarly, the oil phase is mixed (as necessary) in oil phase supply tank 10. Such supply tanks can be sized as desired for production needs and are formed of materials compatible with the composition of the individual phases (For example, the oil phase supply tank 10 should not be constructed of a material that can be plasticized by the oil phase so the tank loses mechanical integrity with time).

The water phase is pressurized by water phase supply pump 15 and the oil phase is pressurized by oil phase supply pump 20. Desirably but optionally, flow meters 25 (water phase) and 30 (oil phase) are used to control the amount of each phase delivered to the system by pumps 15 and 20. Because flow control is desirable, positive displacement pumps (progressive cavity, gear, lobe or the like) having delivery characteristics that are relatively independent of back pressure are particularly suitable.

Optionally, heat exchangers 35 (water phase) and 40 (oil phase) may be provided to heat the phases to a desired processing temperature.

Alternatively, the known heat exchange capabilities of static mixers may be used to heat the phases while they are mixing (see discussion below). For example, either or both of static mixers 55 and 60 could be provided with heat exchange capability for such a task. For example, if the oil phase comprises polymerizable monomers, such heat exchange capability could be used to heat the process stream to a suitable polymerization temperature. Such temperatures are suitably at least about 45° C., typically at least about 55° C., and more typically at least about 65° C. For continuous production of HIPE-derived foams from 1HIPEs produced according to the method of the present invention it is desirable to reduce reaction time to the lowest practical level. As will be recognized increased temperature increases reaction rate and reduces reaction time. For example a polymerization temperature of about 95° C. has been found to provide a reaction time on the order of minutes. Polymerization temperatures higher than 100° C. typically require a pressurized reaction zone (for HIPEs having an aqueous dispersed phase at a polymerization temperature of 165° C. the vapor pressure or water is about 7 atm) and the in-line process of the present invention is particularly desirable because mixers having rotational elements (with the resulting pressure capable bearings) are eliminated. It will be further recognized that it is desirable to form a HIPE having a desired size distribution prior to initiating a polymerization reaction so it may be desirable to provide such heat exchange capabilities using a third static mixer (not shown) downstream of static mixers 55 and 60.

The water and oil phases are contacted at mix point 45. Such a mix point 45 can be as simple as a "T" or "Y" joint in the process piping or somewhat more complex such as an injector in one of the flows that places the flows in a predetermined relationship (e.g. annular flow). It has been found that for HIPEs having low water to oil ratios (between about 4:1 and about 10:1), the oil phase can contact the water phase or vice versa. For HIPEs having higher water to oil ratios (between about 10:1 and about 150:1), the oil phase should contact the water phase because the relative mass flows cause poor premixing if the water phase contacts the oil phase. It should be recognized that such poor premixing can be overcome by a static mixer 55 having a sufficient length (i.e. the static mixer effectively premixes the flows before forming a HIPE) as long as the shear rate is low enough to allow adequate relaxation time (see discussion below). It has been further found that injecting the oil phase into the water phase in an annular relationship allows HIPEs to be produced using a static mixer with fewer segments than are required with simpler process piping, such as a "T" joint. A ratio of injector diameter to pipe diameter of about 1:10 has been found to be suitable. Desirably, a turbulent mixing region 50 equal to about the diameter of static mixer 55 is provided for premixing of the phases before the premixed stream enters static mixer 55 where it is formed into a HIPE.

Static mixer 55 converts the premixed stream comprising a water phase and an oil phase into a HIPE by dividing and recombining the stream so as to disperse microscopic water phase droplets throughout a continuous oil phase. Such static mixers have successfully produced HIPEs at shear rates as low as 10 $sec^{-1}$.

While the method of the present invention will produce HIPEs when static mixer 55 has a horizontal orientation it has been found that an orientation having an angle with respect to the horizontal is desirable so that the flow through static mixer 55 has a vertical component. Preferably the flow axis of the premixed stream has a vertical orientation when it goes through static mixer 55. Such vertical orientation is desirable in order to help compensate for potential density differences between the water phase and the oil phase. As will be recognized, such vertical orientation will help the flow of the premixed stream resist settling of the denser phase and help maintain a more uniform distribution of phases as the premixed stream enters static mixer 55 while the stream viscosity is low (see discussion above) and emulsification has not yet provided resistance to phase settling. A vertical orientation also allows for separation of entrained gasses which may, for example, interfere with polymerization reactions for HIPEs comprising a polymerizable monomer.

It will be further recognized that the premixed stream makes a single pass through static mixer 55 where it is processed into a HIPE. As used herein, a stream is processed in a "single pass" when substantially all portions of the stream are processed into a HIPE without the necessity of recirculating any such portions back through the static mixer in order to achieve the requisite dispersion of the discontinuous internal phase (e.g. a water phase) throughout the continuous external phase (an oil phase). That is, each stream portion passes through the inlet end of static mixer 55, is processed therein, and passes through the exit end a single time as a HIPE. Without being bound by theory, it is believed that the flow division/recombination mixing discussed above is accomplished by providing sufficient extensional shear in static mixer 55 to cause the disperse phase to "string out" and ultimately separate into droplets that are dispersed throughout the continuous phase. As will be recognized by one of skill in the art, the new interfacial area formed by such a process also requires flow of the continuous phase so as to maintain at least a thin film of continuous phase around each droplet. It is believed that, if the shear rate is too high, there is insufficient "relaxation time" to allow for such continuous phase flow and the forming droplets collapse because the continuous phase does not have time to flow around the droplets to form the new interfacial area.

It will also be recognized that if the velocity is too low material will build up on the elements resulting in a reduction of open area in the static mixer, ultimately preventing adequate mixing and stable HIPE formation from occurring. That is, there is a minimum velocity across the elements that is necessary in order that the elements remain unfouled. While such minimum velocity depends on the particular apparatus used for HIPE formation, it has been found that, if the velocity across the elements is on the order of 0.24 meters per second or greater, the elements will be substantially self-cleaning. Combining the necessity of a minimum velocity to prevent fouling as discussed herein with the maximum velocity for HIPE stability discussed above means that any particular static mixer apparatus used to emulsify any particular stream will have both a maximum and minimum velocities therethrough.

In alternate embodiments of the method of the present invention it may be desirable to provide an additional static mixer 60 to further process the HIPE produced by static mixer 55. For example, if additional shear is required to achieve a desired dispersed phase size distribution, a sequence of one or more mixers having increasing applied shear rates can provide shear to further process the HIPE that is produced by a single pass through static mixer 55. Such multiple static mixer processes provide an advantage in that the continuous phase has sufficient relaxation time to flow into the interface so as to maintain the thin film of continuous phase to separate the droplets of disperse phase. Without being bound by theory, it is believed that the relaxation time is available because the continuous phase only needs to flow short distances (i.e. relaxation time is low because flow distance is low) because the continuous phase already surrounds the droplets of the dispersed phase as the HIPE is formed. Such low relaxation times then allow for higher shear rates and (as discussed below) dispersed phases having a lower average size distribution.

Such additional static mixers have been found to be particularly desirable for further processing to reduce the size of the dispersed phase droplets in the relatively coarse HIPE produced by a single pass through static mixer 55. It has been found that a shear rate of at least about 500 $sec^{-1}$ is preferred for such dispersion, while recognizing that shear rate typically varies as function of temperature hence any shear rate is specific for a chemistry at a given temperature. As will be recognized, as cell size decreases additional shear is necessary for successful dispersion. For ok example, a mean cell size of 24 microns requires about 1000 sect and a mean cell size of 12 microns requires about 3000 $sec^{-1}$. The relationship between applied shear and resulting cell size has been found to follow the following empirical equation:

$$CellSize=8.08+14,518.5\times(ShearRate)^{-1}$$

In another embodiment of the present invention (not shown) a recirculation loop can be provided whereby a portion of the HIPE produced by static mixer 55 is recirculated through static mixer 60. Such recirculation can be useful as a means of controlling the amount of shear provided by static mixer 60. As will be recognized, flow velocity through static mixer 60 (hence shear rate therein) is substantially controlled by the velocity through the recirculation loop (given a specific mixer configuration). That is, the flow rate through the static mixer 60 is determined by a recirculation pump (not shown in FIG. 1) rather than water supply pump 15 and oil phase supply pump 20 while finished HIPE flow is determined by the amount of water phase and oil phase delivered to the recirculation loop by water supply pump 15 and oil phase supply pump 20.

In another embodiment of the present invention, HIPE components can be blended into the process stream and incorporated into the emulsion in multiple stages. A particularly useful application of this aspect of the invention is to incorporate a polymerization initiator into an already-formed water in oil HIPE where the oil phase comprises a polymerizable monomer. For example a process stream comprising an aqueous solution of a water soluble initiator, such as potassium persulfate, could be injected into the process stream between static mixer 55 and static mixer 60 (not shown in FIG. 1) so that static mixer 60 could disperse the initiator solution throughout the HIPE.

It should be recognized that the conduit diameter may be varied in order to vary flow rate locally within the conduit relative to the mixing element. Such cross-sectional variability along the axis can be used to increase shear (smaller cross section), decrease shear (increased cross section), or cycle shear rates (repeated increasing and decreasing cross section) along the length of the mixer. For example, in addition to having multiple static mixers with varying cross section as discussed above (systems comprising more than two static mixers are also considered to be within the scope of the present invention), such variation can be provided by providing a conduit wherein conduit cross sectional dimensions vary as a function of conduit length.

As noted above static mixers from Sulzer Chemtech having one or more segments wherein each segment comprises an assembly of bar-like elements oriented at a predetermined angle to a flow axis have been found to be suitable. Other suitable static mixers include those available from Charles Ross and Son Company (as a Model ISG), Komax Systems Inc. as a Komax Motionless Mixer), Koch-Glitsch Inc. (such as a Melt Blender, Model SMX, or a Model SMV).

While commercially available static mixers have a limited number of elements, segments, and the like having a fixed orientation, it should be recognized that variation of commercially available combinations can be used to provide additional desirable properties. For example, the size of the elements as well as the angle to the conduit axis may be varied by segment or by element or both along the axis of the conduit so as to provide increased (or decreased) shear by increasing (or decreasing) angles and inter-element spacing or both along the axis of the mixing conduit. Further, the present invention optionally provides for rapid coarse mixing of the unmixed (lower viscosity) phases via an injecting mixer upstream of the static mixing elements.

In one embodiment, the static mixer of the present invention may be provided by forming a conduit having segments of increasing element count, angle, and decreasing width (e.g. by increased bar count) to effect greater shear along the axis of the mixing conduit. In another embodiment, the element count (and angle) and size may be ordered by increasing the individual element bar count with bars of decreasing width and length placed at an increased angle to the axis along the conduit to provide a continuous increase in shear. In yet another embodiment of the static mixer, individual element bar segments in individual conduit segments may be connected end to end so that each segment may be rotated relative to the other so as to provide a static mixer with adjustable shear along its length by virtue of being able to adjust each segment relative to the other so as to provide adjustable rotationally oriented shear in the transition from one conduit segment to the others. The ends of each segment may be further connected with threaded fittings with O-ring seals so as to allow for adjustment of axial separation between elements bars in each segment as well as rotational orientation. Such a configuration allows for adjustment during use by a control system sensing viscosity, droplet size, or flow rate.

It should be recognized that arrangements of segments having varying degrees of applied shear as described above allows some of the advantages of a dynamic mixer in a much simpler static mixer. For example, shear rates can be adjusted to vary over time (and length) the uniform droplet size being produced or the uniformity of the droplet size. Also, if needed, localized (internal) re-circulating flow can be designed into the mixer via the use of curved mixing elements which impart flow counter to the mainstream.

The method of the present invention also allows for the optional addition of ingredients that are not necessarily a component of the HIPE itself (i.e. a HIPE can be formed with or without the ingredient). Examples of such ingredients include solid materials, such as powders, pigments, fillers, fibers, and the like and off-specification or scrap (e.g. trim from further processing) HIPE derived foam particles. Such optional addition also allows for the recycle of off-specification HIPE to improve the economics of a production operation (As is known recycle of a portion of off specification material is often done as long as the product containing the recycled material meets finished product specifications). Depending on the specific process needs, such optional addition may occur at the inlet to static mixer 55, at the inlet to static mixer 60, or at the inlet to one or more additional static mixers (not shown).

In yet another embodiment of the segmented static mixer, thanks to the "plug flow" behavior of static mixers (absence of tails and segregated fluids being pumped through such mixers), they can be used as process components where the HIPE is further processed. Examples of such further processing include injection molding, casting, extrusion, and similar applications, where clean and quick changeovers among different formulations and/or start/stop procedures are required and where changes are needed to the mixing characteristics due to the change in formulation.

Finally it should be recognized that multiple static mixers may be ordered in parallel (including an annular configuration) to provide for ordered structures in the resulting HIPE. For example, two static mixers designed to provide different amounts of shear so as to provide a first HIPE having differing droplet sizes can provide HIPEs with a relatively large open cell structure formed continuously in a predetermined relationship with a second HIPE having a relatively small open cell structure. Such HIPEs can be then polymerized to provide HIPE-derived foams having a similar relationship in cell sizes so as to provide for acquiring and distributing fluids (through large open cell structures) and for storing fluids (comprised of smaller open-celled structures). Examples of such heterogeneous foam structures are described in U.S. Pat. No. 5,817,704, issued to Shiveley, et al. on Oct. 6, 1998.

III. SCALE-UP

In order to predict and scale-up the first stage, that is, the coarse emulsion formation stage, the ratio Es/Q is preferably kept constant. That is:

$$A*Es/Q=K$$

where:
- A is a constant that varies from 0 to 1, depending on the mixer geometry. For example, for the aforementioned SMX mixer A is approximately 1.
- Es (units of $m^2$) is the "active" mixer surface area. That is, the element surface that is directly exposed to the flow having relatively constant physical-and chemical properties with time. For example, for mixer diameters greater than about 20 mm (¾") Es is the element surface area facing the flow direction, that is free of foreign material that can inhibit its wetting/dispersion ability. For smaller mixers Es also comprises the top surface of the mixing elements and the piping wall. This active surface can be assessed using various means, including on-line microscopy.

Q is the volumetric flow rate (units of $m^3/s$). Table 1 lists active surface (Es), diameter, and volumetric flow rate for different SMX mixers that have successfully produced coarse HIPEs. As can be seen, the Es/Q ratio is substantially constant within an experimental error of $1.05*10^{+2}+/-15\%$.

TABLE 1

| Mixer Diameter (m) | Es ($m^2$) | Flow Rate* ($m^3/s$) | Ratio: Es/Q |
|---|---|---|---|
| $5.2 * 10^{-3}$ | $3.92 * 10^{-4}$ | $4.15 * 10^{-6}$ | $0.95 * 10^{+2}$ |
| $15.1 * 10^{-3}$ | $2.67 * 10^{-3}$ | $2.67 * 10^{-5}$ | $1.00 * 10^{+2}$ |
| $20.6 * 10^{-3}$ | $3.45 * 10^{-3}$ | $3.99 * 10^{-5}$ | $0.90 * 10^{+2}$ |
| $26.2 * 10^{-3}$ | $2.82 * 10^{-3}$ | $2.27 * 10^{-5}$ | $1.20 * 10^{+2}$ |
| $102 * 10^{-3}$ | $3.25 * 10^{-2}$ | $3.07 * 10^{-4}$ | $1.06 * 10^{+2}$ |

*Experimentally determined

As noted above, a second static mixer, such as static mixer 60, can be used to "polish" the internal phase size distribution of the HIPE. For such a second stage, there is a relationship between mixing Shear Rate and the resulting mean dispersed phase droplet diameter. For such a relationship to exist, it has been found that the residence time in the second static mixer should be on the order of 0.5 seconds. Such a relationship is demonstrated in Example 2 below. An empirical equation for the relationship determined from the data in Example 2 is:

Mean Droplet Diameter=A*B*(1/Shear Rate)

Where

A and B are experimentally determined constants with:

A=7.546; and
B=14,680;
Shear Rate has units of inverse seconds; and
Mean Droplet Diameter has units of microns.

IV. EXAMPLES

Example 1

Pre-made water (heated up) and oil (room temperature) phases are pumped separately under pressure to a static mixer injection point. The injector is configured with the oil injected at the center of the pipe (water flowing annularly therearound) through an orifice (restricted open section), of a diameter equal to ⅒ of the static mixer diameter and away from the first static mixing element not more than approximately 1 mixer diameter length. The injected liquids are passed through (1 or more) static mixer segments in a series. The mixer axis is vertically oriented with the flow being upward.

Increased water to oil ratios, and increased flow rates resulted in the pressure drops and cell size as shown in Table 2:

TABLE 2

| Total Flow Rate (Kg/min) | HIPE water to oil Ratio | Pressure drop across the mixer (bar) | Cell size* |
|---|---|---|---|
| 0.27 | 10:1 | 0.1 | Large |
| 1.20 | 30:1 | 0.2 | Large |
| 2.40 | 45:1 | 0.3 | Large |
| 2.19 | 60:1 | 3.1 | Medium |
| 2.13 | 80:1 | 3.1 | Medium |

*= from Scanning Electron Micrographs

Different cells size accomplished with varying total flow rate and mixer configurations (described as number of segments, diameter, and elements within each segment) at a constant oil phase to water phase ratio produced cell sizes after polymerization as shown in Table 3.

TABLE 3

| Water Phase | | Oil Phase | | | | | |
|---|---|---|---|---|---|---|---|
| Flow Rate (Kg/min) | Temperature (Degrees C.) | Flow Rate (Kg/min) | Temperature (Degrees C. | W/O Ratio | Static Mixers | Pressure Drop (Bar) | Cell Size * (microns) |
| 0.24 | 55–75 C. | 0.01 | 15–25 | 45:1 | 1: 6 mm 36 segments | 2. | 25 microns |
| 0.49 | 55–75 C. | 0.01 | 15–25 | 45:1 | 2: 21 mm 48 segments & 6 mm 36 segments | 1.0 | 14 microns |
| 0.67 | 55–75 C. | 0.02 | 15–25 | 45:1 | 2: 21 mm 48 segments & 6 mm 24 segments | na. | 12 microns |
| 1.20 | 55–75 C. | 0.03 | 15–25 | 45:1 | 2: 21 mm 48 segments & 6 mm 36 segments | 2.9 | 11 microns |
| 2.11 | 55–75 C. | 0.05 | 15–25 | 45:1 | 2: 21 mm 48 segments & 16 mm 24 segments | 3.2 | 39 microns |
| 0.49 | 55–75 C. | 0.01 | 15–25 | 45:1 | 1: 16 mm 24 segments | na. | 50 microns |
| 15.00 | 55–75 | 0.33 | 15–25 | 45:1 | 2: 102 mm 41 segments & 26.6 mm 48 segments | 2.8 | 17 microns |
| 20.00 | 55–75 | 0.44 | 15–25 | 45:1 | 1: 102 mm 41 segments | 0.3 | 33 microns | na. = not available,
* = from Scanning Electron Micrographs

Table 4 compares the cell size and cell size distribution achieved with a dynamic pin mixer having re-circulation with results from the system and process of the present invention.

TABLE 4

|  | Average Cell size | % Relative Standard Deviation | Size Range* (mean ± 1 std deviation) |
|---|---|---|---|
| PIN MIXER (with re-circulation) | 12 microns | 35% | 12 ± 4 microns |
| STATIC MIXER (no recirculation) | 13 microns | 22% | 13 ± 3 microns |

*= from Scanning Electron Microscopy pictures

The effect of two mixers is shown in Tables 5 and 6.
Table 5 shows the effect of two mixed segments of decreasing diameter put in series.

TABLE 5

| Flow Rate (Kg/min) | Number of Mixers | Mixer Diameter | Water to Oil Ratio | HIPE formed? |
|---|---|---|---|---|
| 0.50 | 1 | 16 mm | 45:1 | Yes |
| 0.75 | 1 | 16 mm | 45:1 | Yes |
| 1.20 | 1 | 16 mm | 45:1 | Yes |
| 1.40 | 1 | 16 mm | 45:1 | No |
| 2.07 | 1 | 16 mm | 45:1 | No |
| 0.67 | 2 (in series) | 21 mm + 6 mm | 45:1 | Yes |
| 1.20 | 2 (in series) | 21 mm + 6 mm | 45:1 | Yes |
| 2.11 | 2 (in series) | 21 mm + 6 mm | 45:1 | Yes |

It can be seen that HIPE was formed using two above flow rates with did not produce HIPE with a single, constant diameter mixer. As noted above, a single static mixer having sufficient length could also produce a HIPE. However, it should be recognized that the two mixer configuration provides HIPEs more efficiently (less overall mixer length, reduced pressure drop, etc.).

Table 6 shows the effect of applied shear rate in a second mixer on particle size for a coarse HIPE that was formed in a first mixer.

TABLE 6

| Applied Shear Rate ($sec^{-1}$) | Mean Droplet Diameter (Microns) |
|---|---|
| 129 | 121.6 |
| 462 | 38.9 |
| 979 | 23.7 |
| 1214 | 17.0 |
| 2111 | 13.6 |
| 3090 | 12.3 |
| 7144 | 11.1 |
| 7300 | 10.6 |

Droplet size may be measured using light microscopy and/or scanning electron microscopy using techniques as are known to the art as suitable for the composition of the HIPE.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While various embodiments and/or individual features of the present invention have been illustrated and described, it would be obvious to those skilled in the art that various other changes and modifications can be made without departing from the spirit and scope of the invention. As will be also be apparent to the skilled practitioner, all combinations of the embodiments and features taught in the foregoing disclosure are possible and can result in preferred executions of the invention. It is therefore intended to cover in the appended claims all such changes and modifications that are within the scope of this invention.

All percentages, ratios and proportions are by weight, and all temperatures are in degrees Celsius (°C.), unless otherwise specified. All measurements are in SI units unless otherwise specified.

What is claimed is:

1. A method for continuous, one-through production of a high internal phase emulsion, the method comprising the steps of:
    a) providing a first phase;
    b) providing a second phase, wherein said second phase is substantially immiscible with said first phase and the ratio of said first phase to said second phase is between about 2:1 and about 250:1;
    c) processing said first and second phases using a first static mixer, having at least one segment, in a single pass so as to provide sufficient shear without the use of rotating elements to emulsify said first phase in said second phase creating said high internal phase emulsion (HIPE) having a internal phase size distribution with a mean particle size.

2. A method according to claim 1 wherein said method further comprises the step of combining said first and second phases to provide a premixed process stream and said premixed process stream is processed into a HIPE by said first static mixer.

3. A method according to claim 1 wherein said first phase comprises a water phase and said second phase comprises an oil phase.

4. A method according to claim 3 wherein said oil phase comprises polyrnerizable monomers.

5. A method according to claim 3 wherein said oil phase comprises:
    (a) from about 80% to about 98% by weight of a monomer component capable of forming a copolymer having a Tg value of from about −20° C. to about 90° C., said monomer component comprising:
        (i) from about 10% to about 70% by weight of a substantially water-insoluble, monofunctional monomer capable of forming a homopolymer having a Tg of about 35° C. or less;
        (ii) from about 10% to about 70% by weight of a substantially water-insoluble, monofunctional comonomer capable of imparting toughness about equivalent to that provided by styrene;
        (iii) from about 2% to about 50% of a first substantially water-insoluble, polyfunctional crosslinking agent selected from the group consisting of divinyl benzene and analogs thereof; and
        (iv) from about 0% to about 15% of a second substantially water-insoluble, polyfunctional crosslinking agent selected from the group consisting of diacrylates of diols and analogs thereof; and
    (b) from about 2% to about 20% by weight of an emulsifier component which is soluble in the oil phase and which is suitable for forming a stable water-in-oil emulsions.

6. A method according to claim 1 wherein said method further comprises the step of providing a second static mixer having an inlet and an outlet, wherein said second static mixer further processes said HIPE to provide a processed HIPE having a second internal phase size distribution wherein a mean particle size thereof is less than said mean particle size of said HIPE.

7. A method according to claim 1 wherein said static mixer has an entry end, an exit end, and a flow direction from said entry end toward said exit end such that downstream is away from said entry end, said static mixer comprising two or more segments wherein each of said segments is oriented at a rotational angle with respect to said segment lying adjacently downstream thereof.

8. A method according to claim 7 wherein said rotational angle is 90 degrees.

9. A method according to claim 1 wherein said static mixer is oriented at an angle with respect to a horizontal plane.

10. A method according to claim 9 wherein said angle of orientation is 90 degrees such that said static mixer is substantially perpendicular to a horizontal plane.

11. A method according to claim 6 wherein a portion of said processed HIPE is recirculated from said outlet of said second static mixer and introduced into said inlet where said processed HIPE is processed with said HIPE produced by said first static mixer.

* * * * *

UNITED STATES PATENT AND TRADEMARK OFFICE
CERTIFICATE OF CORRECTION

PATENT NO.    : 6,369,121 B1
DATED         : April 9, 2002
INVENTOR(S)   : Catalfamo et al.

It is certified that error appears in the above-identified patent and that said Letters Patent is hereby corrected as shown below:

Title page,
ABSTRACT,
Line 5, "farther" should read -- further --.

Column 2,
Line 16, "star" should read -- start --.
Line 22, "Such" should read -- such --.

Column 3,
Line 4, "carnal" should read -- external --.
Line 54, "fitty" should read -- fatty --.

Column 4,
Line 31, "300º" should read -- 30º --.
Line 37, "250º" should read -- 25º --.
Line 53, "a allyl" should read -- alkyl --.

Column 5,
Line 10, "1-methyl-2-vinyl4,6-" should read -- 1-methyl-2-vinyl-4,6- --.
Line 60, "pentaerythntol" should read -- pentaerythritol --.
Line 63, "catecliol" should read -- catechol --.
Line 67, "pentaerydritol" should read -- pentaerythritol --

Column 6,
Line 1, "N-methylolacrylamnide" should read -- N-methylolacrylamide --.
Line 51, "noniomic" should read -- nonionic --.

Column 7,
Line 9, "ditailowdimethyl" should read -- ditallowdimethyl --.
Line 49, "40%/o" should read -- 40% --.

Column 8,
Line 16, "dirnethyl" should read -- dimethyl --.

UNITED STATES PATENT AND TRADEMARK OFFICE
CERTIFICATE OF CORRECTION

PATENT NO. : 6,369,121 B1
DATED : April 9, 2002
INVENTOR(S) : Catalfamo et al.

It is certified that error appears in the above-identified patent and that said Letters Patent is hereby corrected as shown below:

Column 9,
Line 16, "2,2,5,5-pentarnethylpiperidinyl" should read
-- 2,2,5,5-pentamethylpiperidinyl --.
Line 16, "Trinuvin" should read -- Tinuvin --.
Line 17, "(IPS)" should read -- (HPS) --.
Line 53, "he" should read -- the --.

Column 12,
Line 37, "1HIPEs" should read -- HIPEs --.

Column 14,
Line 43, "ok" should be deleted.
Line 44, "sect" should read -- sec$^{-1}$ --.

Column 18,
Line 21, "size" should read -- sizes --.

Column 20,
Line 32, "polyrnerizable" should read -- polymerizable --.
Line 58, "emulsions" should read -- emulsion --.

Signed and Sealed this

Third Day of September, 2002

Attest:

JAMES E. ROGAN
Attesting Officer        Director of the United States Patent and Trademark Office